United States Patent
Thompson et al.

(10) Patent No.: US 10,674,200 B1
(45) Date of Patent: Jun. 2, 2020

(54) ENABLING A LAST VIEWED ZONE

(71) Applicant: Cox Communications, Inc., Atlanta, GA (US)

(72) Inventors: Catherine Elizabeth Thompson, Roswell, GA (US); James Alan Strothmann, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 105 days.

(21) Appl. No.: 15/043,495

(22) Filed: Feb. 12, 2016

Related U.S. Application Data

(60) Provisional application No. 62/256,903, filed on Nov. 18, 2015.

(51) Int. Cl.
*H04N 21/431* (2011.01)
*H04N 21/482* (2011.01)
*H04N 21/426* (2011.01)

(52) U.S. Cl.
CPC ..... *H04N 21/4316* (2013.01); *H04N 21/4263* (2013.01); *H04N 21/4821* (2013.01)

(58) Field of Classification Search
CPC ........... H04N 21/4438; H04N 21/4532; H04N 21/4622; H04N 21/4821; H04N 5/44543; H04N 5/44591; H04N 5/45; H04N 21/4332; H04N 21/44204; H04N 21/44222; H04N 21/4826; H04N 21/482; H04N 5/4403; H04N 21/2665; H04N 21/4314; H04N 21/4221; G06F 3/0482; G06F 3/04842

See application file for complete search history.

(56) References Cited

U.S. PATENT DOCUMENTS

| | | | | | |
|---|---|---|---|---|---|
| 5,161,023 | A | * | 11/1992 | Keenan | H03J 1/0091 348/732 |
| 5,737,029 | A | * | 4/1998 | Ohkura | H04N 5/45 348/569 |
| 7,061,549 | B1 | * | 6/2006 | Mabon | H04N 5/44 348/731 |
| 8,640,166 | B1 | * | 1/2014 | Craner | H04N 21/4826 725/37 |
| 8,756,620 | B2 | * | 6/2014 | Papish | H04N 21/44204 348/732 |
| 8,776,119 | B2 | * | 7/2014 | Rolls | H04N 21/4622 725/38 |
| 9,326,035 | B1 | * | 4/2016 | Thompson | H04N 21/482 |

(Continued)

*Primary Examiner* — Robert J Hance
*Assistant Examiner* — Jen-Shi Huang
(74) *Attorney, Agent, or Firm* — Merchant & Gould

(57) ABSTRACT

A last viewed zone comprising video streams of a predetermined number of last viewed channels is provided. Channels selected by a user are identified and added to a channel list, which is maintained and stored in a temporary repository. When a selection of the last viewed zone is received, a last viewed zone user interface comprising a predetermined number of channels from the channel list is generated for display on the user's display device in a mosaic fashion such that the video streams of each of the channels may be viewed simultaneously. Additional functionalities like audio may be provided for the video stream of user's choice. The channels within the channel list may include the last channels tuned-to on the viewing device and user selected channels.

18 Claims, 14 Drawing Sheets

(56) References Cited

U.S. PATENT DOCUMENTS

| | | | |
|---|---|---|---|
| 2002/0056098 A1* | 5/2002 | White | H04N 5/44 725/39 |
| 2003/0018973 A1* | 1/2003 | Thompson | H04H 60/40 725/47 |
| 2003/0056216 A1* | 3/2003 | Wugofski | H04N 5/44543 725/46 |
| 2005/0102696 A1* | 5/2005 | Westberg | H04N 5/44543 725/46 |
| 2007/0079330 A1* | 4/2007 | Ludvig | H04N 5/4403 725/38 |
| 2007/0157220 A1* | 7/2007 | Cordray | H04H 60/65 725/9 |
| 2007/0204297 A1* | 8/2007 | Gonzalez | H04N 5/44543 725/41 |
| 2007/0204302 A1* | 8/2007 | Calzone | H04N 21/4755 725/46 |
| 2007/0234388 A1* | 10/2007 | King | H04N 5/44543 725/39 |
| 2008/0259220 A1* | 10/2008 | Stahulak | H04N 5/44543 348/734 |
| 2009/0083824 A1* | 3/2009 | McCarthy | H04N 5/44591 725/151 |
| 2009/0119703 A1* | 5/2009 | Piepenbrink | H04N 21/23436 725/34 |
| 2009/0222757 A1* | 9/2009 | Gupta | H04N 5/44543 715/776 |
| 2010/0037257 A1* | 2/2010 | Jacobson | H04N 21/23424 725/38 |
| 2011/0035774 A1* | 2/2011 | Parker | H04N 5/44543 725/40 |
| 2013/0014150 A1* | 1/2013 | Seo | H04N 21/44222 725/14 |
| 2013/0283318 A1* | 10/2013 | Wannamaker | H04H 20/30 725/56 |
| 2014/0049695 A1* | 2/2014 | Papish | H04N 21/44204 348/731 |
| 2015/0067708 A1* | 3/2015 | Jensen | H04N 21/4756 725/10 |
| 2017/0064390 A1* | 3/2017 | Kannan | H04N 21/25891 |

* cited by examiner

XYZ
TV PROVIDER
TELEVISION
VIEWING GUIDE
FRI 9/7 11:00 AM

USER  SWITCH USER

Hello MIKE

LAST VIEWED ZONE — 203

| GUIDE | | | | | |
|---|---|---|---|---|---|
| THURSDAY 9/5 | 8:30-9:00 AM | 9:00-9:30 AM | 9:30-10:00 AM | 10:00-10:30 AM | 10:30-11:00 AM |
| CHANNEL 1015 | TRAVEL X | WONDER WORLD | | 11TH WONDER | |
| CHANNEL 1078 | FRIEND FOR LIFE | | MRS. BB | FRIEND FOR LIFE | |
| CHANNEL 1096 | DESPERATE MEA. | MIA | | HERE COMES VIC. | INTERNATIONAL |
| CHANNEL 25 | FAMILY SHOW 1 | CHEER LEADING | | FAMILY SHOW 2 | |
| CHANNEL 107 | TEEN SPIRIT | | | HOW I MET HIM | |
| CHANNEL 225 | FISHING SHOW 1 | SKYDIVING | | FITNESS EXTREME | EATING RIGHT |

FIG 3A

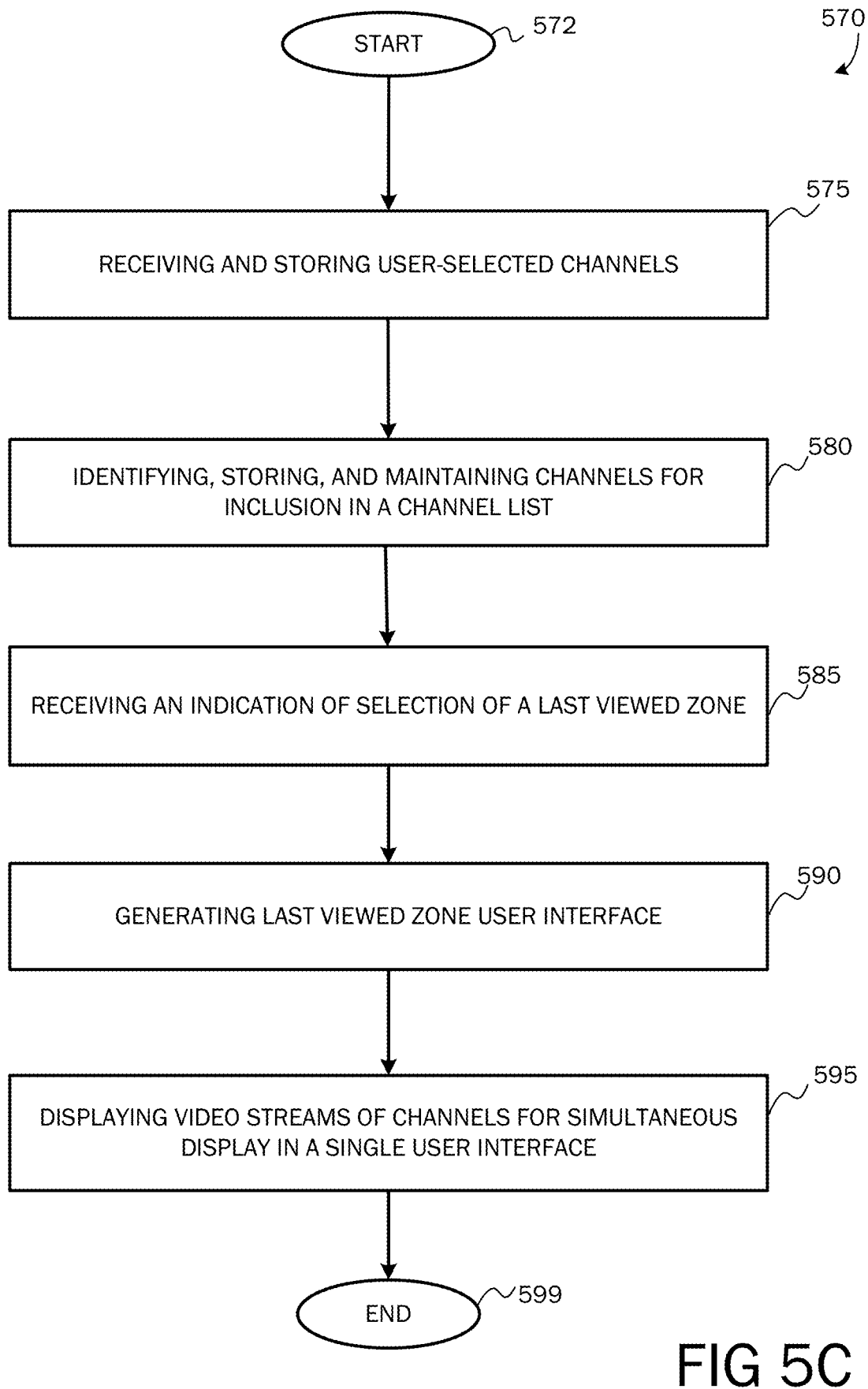

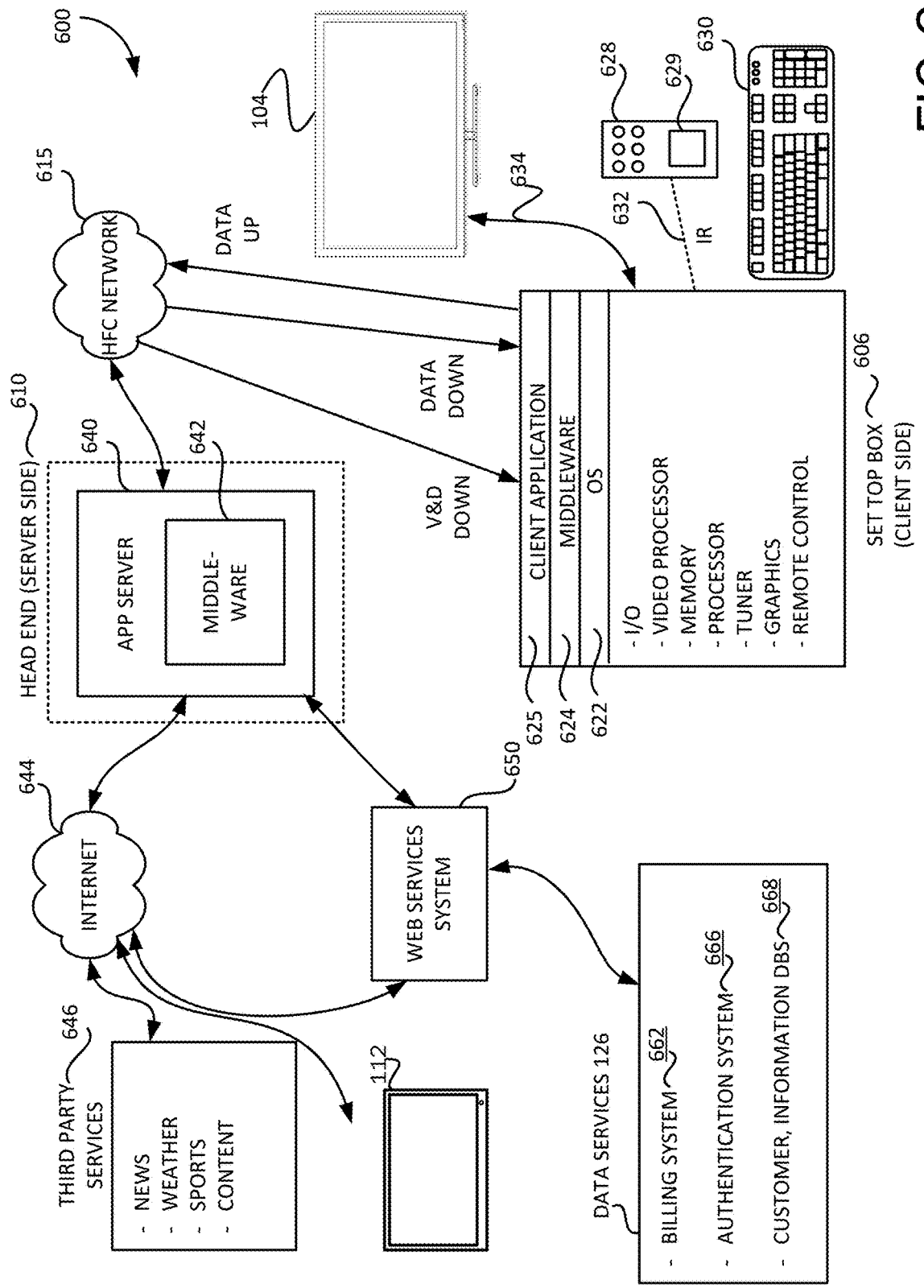

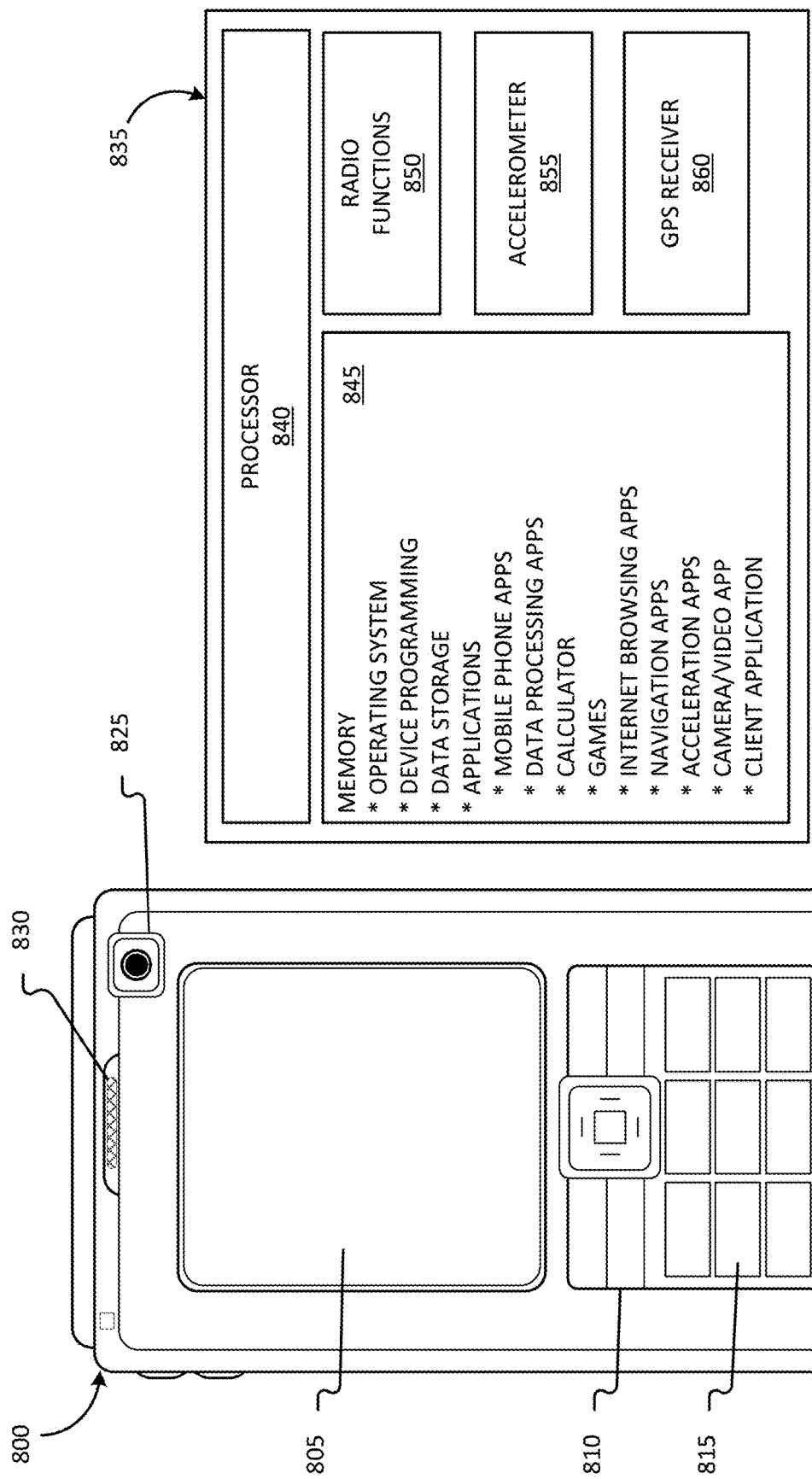

ENABLING A LAST VIEWED ZONE

RELATED APPLICATIONS

This application claims priority from U.S. Provisional Patent Application No. 62/256,903 titled, "ENABLING A LAST VIEWED ZONE" and having a filing date of Nov. 18, 2015, which is incorporated herein by reference.

BACKGROUND

When watching television, it is common for users to channel surf or switch between several channels. For example, oftentimes users desire to see what is on other channels while watching a particular program, particularly during commercial breaks. As another example, a user may be interested in content airing at the same time on different channels, and may choose to tune back and forth between the channels.

Users have to remember the channels they are watching and manually enter the channel number to return to a certain channel. Additionally, when jumping between channels, users oftentimes unintentionally miss out on parts of programming. For example, if the user gets distracted watching an interesting part of a video content item, the user may miss a desired portion of the other video content item for that time period.

It is with respect to these and other considerations that aspects of the present disclosure have been made.

SUMMARY

Aspects of the present disclosure provide for automatically populating a plurality of video streams into a single mosaic display, enabling a user to easily view the content that is airing on multiple channels at one time, and to easily switch between the channels. According to an aspect, the video streams displayed in the single display are video streams of content airing on a last N channels to which the user has tuned, wherein N is the number of video streams that may be provided simultaneously according to capabilities/limitations of the user's device or the service provider's system. A channel list comprising a plurality of channels previously tuned to by the user is maintained and stored for a predetermined number of channels as the user tunes to a channel on an associated viewing device. According to another aspect, the video streams displayed in the single display are the video streams of content airing on channels preselected by the user. For example, the channel list in this case will include the list of channels that have been preselected by the user. The video streams are displayed in a single user interface referred to herein as a last viewed zone.

When an indication of a selection to view a last viewed zone is received, a plurality of video streams are presented on the user's display device in a mosaic fashion, such that video streams from the channel list can be viewed simultaneously. According to an aspect, the video streams are selectable for various functionalities. For example, the user may select a video stream to hear the audio for the selected video stream, to tune to the selected video stream in a full screen display, to record the selected video stream, to view more information about the selected video stream, etc.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the present disclosure as claimed.

BRIEF DESCRIPTION OF THE DRAWINGS

Referring now to the drawings in which like reference numbers represent corresponding parts throughout the several figures:

FIG. 2A, is an illustration of an example option for invoking a last viewed zone user interface from a guide user interface;

FIG. 3A is an illustration of an example user interface for receiving a user selection of channels, from a guide user interface, to be displayed in a last viewed zone user interface;

FIG. 5C is a flowchart illustrating another example method for providing a last viewed zone;

FIG. 6 is a block diagram illustrating a cable television services system architecture providing an operating environment;

FIGS. 8A and 8B illustrate a suitable mobile computing environment with which aspects are practiced.

DETAILED DESCRIPTION

Figure 1A:
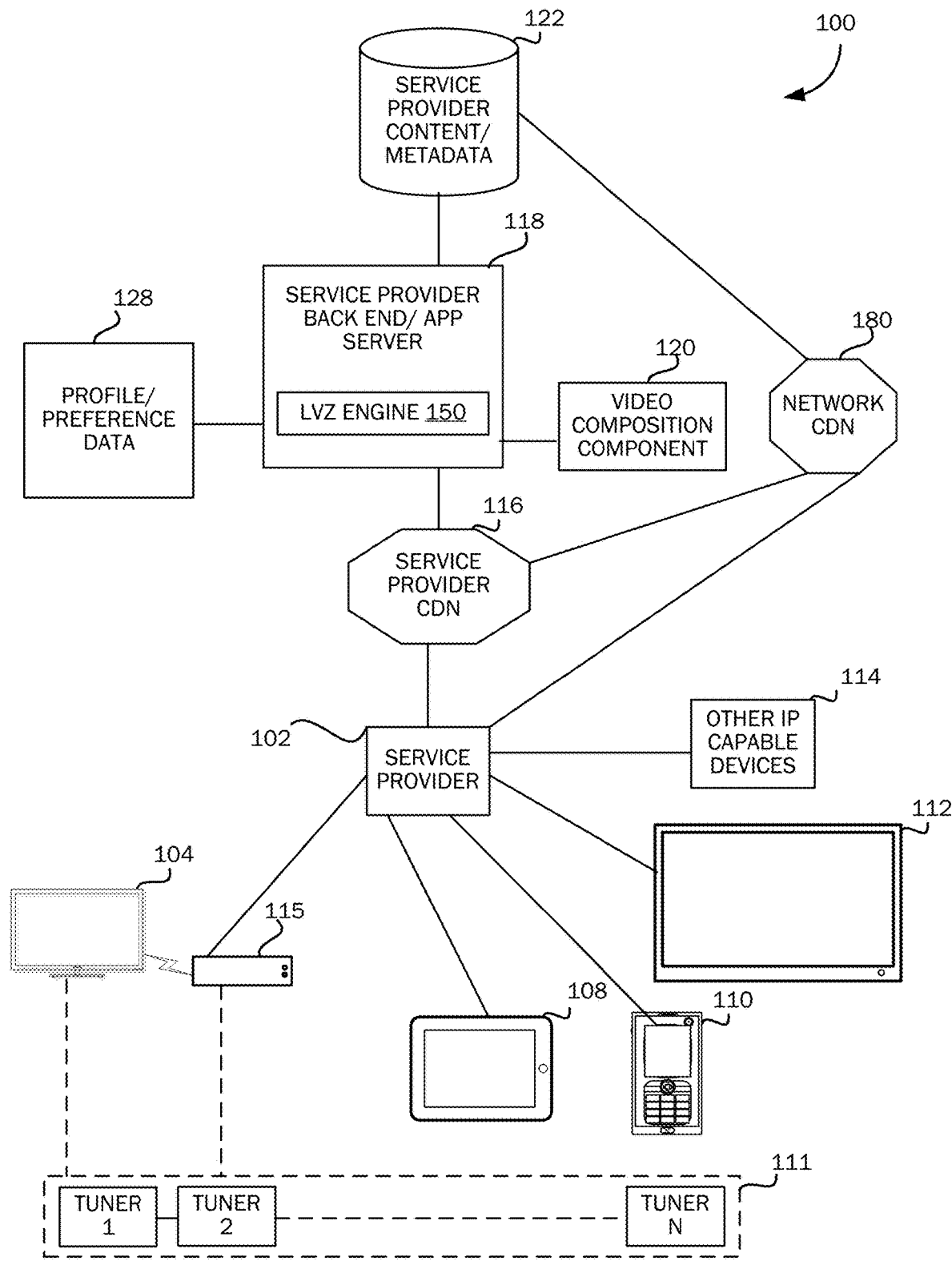
FIG. 1A is a block diagram of one example of a system for providing a last viewed zone.

As briefly described above, aspects of the present disclosure are directed to displaying a plurality of video content streams in a mosaic style last viewed zone. According to an aspect, when a user views a channel, for example, as the user is browsing through channels, the channel is added to a channel list comprising a number of previously watched channels. In response to receiving a selection to view a last viewed zone, a last viewed zone engine selects a predetermined number (N) of channels to display in the last viewed zone, wherein N is based on limitations of the user's device or the service provider's system or user preference. When selected by the user, video streams of the selected channels are presented on the user's display device in a mosaic fashion such that the video streams of each of the channels can be viewed simultaneously. According to an aspect, audio is provided for the video stream of the user's choice.

According to another aspect, the channel list includes one or more channels manually set by the user. According to yet another aspect, the channel list includes a combination of channels that are manually set by the user and channels that were previously viewed by the user.

These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents. Referring now to the drawings, in which like numerals refer to like elements throughout the several figures, aspects of the present disclosure and an exemplary operating environment will be described.

FIG. 1A is a block diagram of one example of a system 100 for providing a last viewed zone. Referring to FIG. 1A, a service provider 102 is illustrated for providing a variety of video content items to users/subscribers via one or more receiver devices. The service provider 102 is illustrative of any service provider, for example, a cable television service provider, a satellite-based television service provider, an Internet protocol-based service provider, or any other service provider that is operable to provide audio, video, or a combination of audio and video content to users/subscribers for consumption via a variety of receiving devices. A detailed illustration and description of an example cable television services provider system is provided below with reference to FIG. 6.

Receiving devices include any device capable of receiving audio and video content and for allowing consumption of the content. For example, a receiving device may include such devices as a television set 104 and associated converter device 115, such as a set-top box (STB) or other gateway device, a tablet computing device 108, a mobile telephone 110, a smart television 112, or other Internet Protocol (IP) capable device 114. As will be described below, each of these types of devices may be used for accessing and consuming content via a primary service provider 102.

A service provider content delivery network (CDN) 116 is illustrated in association with the service provider 102, and a service provider back end/application server 118 are illustrated in association with a service provider CDN 116. As should be appreciated, the layout of the functionalities of the service provider including the service provider CDN 106, and the service provider back end/application server 118 system are for purposes of illustration only and are not restrictive of the various layouts and combinations of systems that may be utilized by a given service provider for providing content to users/subscribers.

According to aspects, a service provider back end/application server 118 provides functionality for maintaining profile information on users/subscribers including permissions for users/subscribers to utilize service provider functionality including consumption of service provider content and including such functionalities as content preferences, parental control systems, billing systems, and the like. The back end/application 118 server for the service provider provides operating functionality, for example, one or more software applications and associated databases for directing content distribution provided by the service provider 102 to users/subscribers at the endpoint devices 104, 108, 110, 112, 114, 115.

The service provider CDN 116 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider 102 to the users/subscribers. CDNs typically function by receiving requests from clients, checking a local cache for a copy of the requested resource, or querying some source if a requested resource is not in the cache or has expired, for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video. For example, if a given user/subscriber operating the tablet computing device 108 selects a news story for live streaming to the tablet computing device 108 as offered by the service provider 102, the application server at the back end application server may cause a media player to activate for streaming the desired content from the service provider CDN 116 to the user's tablet computing device 108 via IP-based transmission to the tablet computing device 108.

The service provider content/metadata 122 is illustrative of content and associated descriptive metadata that are maintained and provided by the primary service provider 102, or is obtained from third party sources. According to an aspect, the content/metadata 122 also comprise information associated with the content including descriptive metadata for use in distributing the content and associated metadata through the back end/application server 118 of the service provider 102 via the service provider CDN 116, as described above. According to an aspect, as should be appreciated, metadata associated with content includes information such as content titles, content authors, content creation date, content ratings, information describing content plots, summaries, mood, or any other information that may be provided in association with a given content item. In addition to metadata associated with a given content item, for example, a movie, television show, news event, sports event, and the like, additional metadata for the content item may be produced and provided by the service provider, for example, information relating to viewing times, viewing channels, and the like designated by the service provider 102.

The converter device 115 is illustrative of a device at the user's end operable to provide services by the service provider 102. According to one aspect, the device is an STB comprising a plurality of tuners 111. According to another aspect, the device is a full service gateway device comprising a plurality of tuners 111. According to an aspect, the service provider 102 leverages the tuners 111 available to a full service gateway device to stream channels and transcode those to a single mosaic style output. According to another aspect, the tuners are associated with the user's endpoint device 104, 108, 110, 112, 114 or to the full service gateway device.

According to another aspect, the tuners 111 are operable to identify, store and maintain the channel list, such that when an indication of a selection to view a last viewed zone is received, video streams of content airing on the channels from the channel list are buffered and made available to the user's display device by the tuners 111. For example, in an STB with N tuners 111, a channel list of up to N channels may be maintained by the STB for provision in a last viewed zone. The user is enabled to request content via a first channel using the first tuner 111A, make a new request for content via a second channel using the second tuner 111B, etc., until the user has made N requests for content. When the user makes request N+1, the request for content will be made via the first tuner 111A, request N+2 will be made via the second tuner 111B, etc., at which time the channel to which the tuner 111 is tuned is changed. To illustrate, when the user is viewing channel one via the first tuner 111A and requests channel two, the first tuner 111A will remain tuned to channel one, and the second tuner 111B will be tuned to channel two, and the STB will provide the signal received by the second tuner 111B to the display device. When the user requests the last viewed zone, the collection of tuners 111 are already tuned to the last N channels, and the mosaic view of these channels may be quickly provided by the STB to the user without the STB needing to re-tune multiple tuners 111.

As will be understood, a given tuner 111 may be re-tuned multiple times in succession to account for the user preferences or the user "channel surfing" to a desired channel. For example, users may input "channel up" or "channel down" commands multiple times instead of a channel number to reach a desired channel, or users may indicate that they do not like channel/content item Z, or are particularly interested in channel/content item Y. To address "channel surfing," when a user requests a new channel, the given tuner 111 may be re-tuned instead of switching to and tuning the next tuner 111 when a predetermined period of time between channel requests has not been met (e.g., the user stays tuned to a given channel for N seconds before the next tuner 111 is switched to). As will be understood, "channel surfing" may be limited to commands for "channel up/down" made in rapid succession, or may include commands for specific channels (e.g., entering a channel number, pressing a "favorites key," etc.). In various aspects, the STB may generate a visual indicator to alert the user that a given channel has been tuned to long enough to be added to the last viewed zone. User preferences may also state that a given channel or a given content item will remain tuned to or will not remain tuned to by one of the tuners 111. For example, a user may indicate that a given channel should always appear in the last viewed zone, and the tuner 111 will be dedicated to that channel.

The last viewed zone may be invoked by a variety of mechanisms. According to an aspect, a video composition component 120 is provided, which is operable to identify, store, and maintain the channel list, such that it allows the video composition component 120 to generate the last viewed zone with channels from the channel list.

According to another aspect, the video composition component 120 is operable to store and maintain the channel list for the channels preselected by the user. Upon receiving an indication of a user selection, the video composition component 120 is operable to generate a mosaic style output with streaming videos of the selected channels for display in a last viewed zone.

According to another example, the last viewed zone is invoked via a network CDN 180. The service provider 102 is operable to identify the channels from the network CDN 180, and store and maintain the channels in a channel list. This allows the service provider 102 to provide the last viewed zone irrespective of the availability of the tuners 111.

Figure 1B:
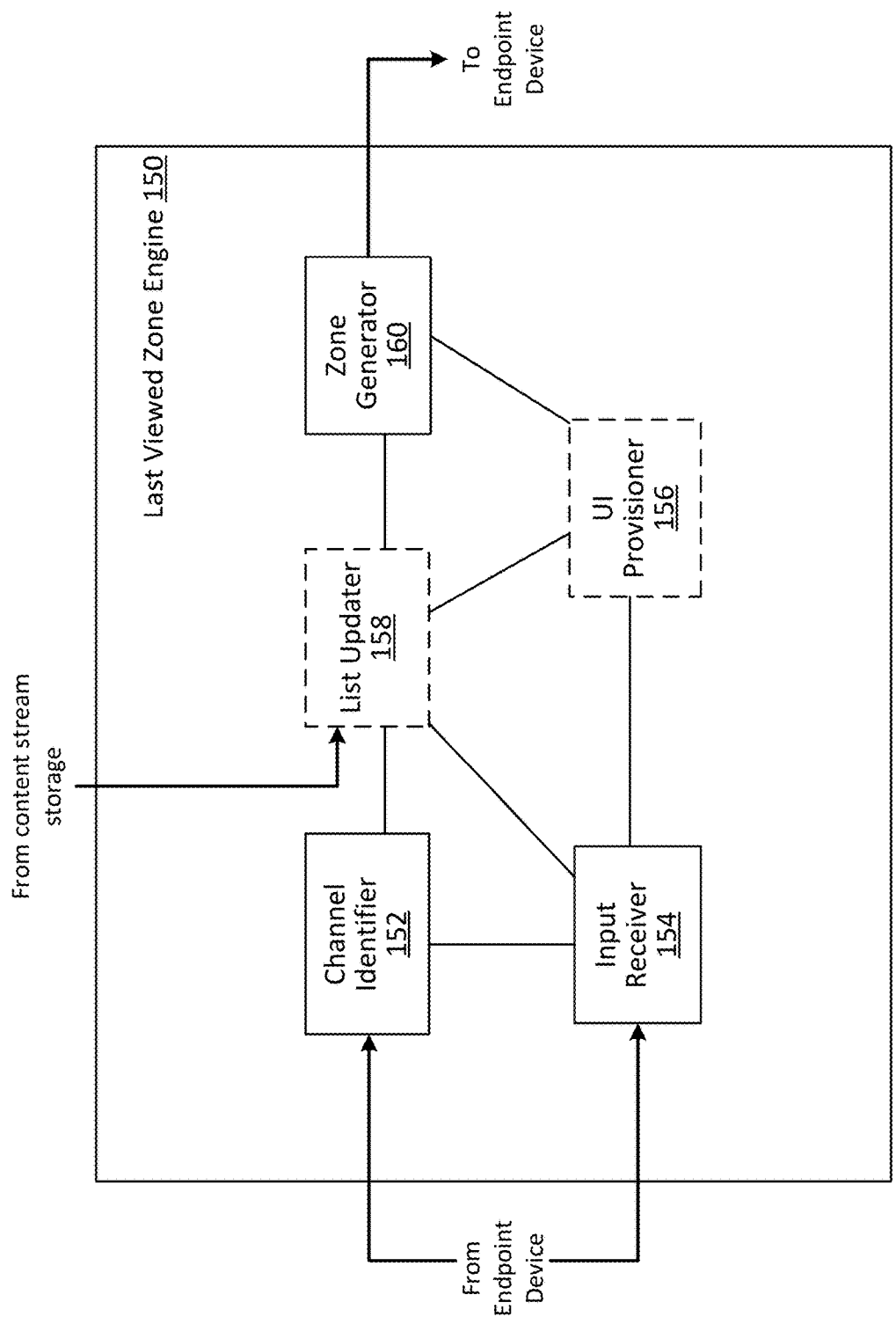
FIG. 1B is a block diagram of one example of a last viewed zone engine.

FIG. 1B is a block diagram of example components of a last viewed zone engine 150. In the illustrated example, the last viewed zone engine 150 comprises a channel identifier 152, an input receiver 154, a user interface (UI) provisioner 156, a list updater 158, and a zone generator 160.

When the user switches from one channel to another, the channel identifier 152 is operable to identify the channels, and store and maintain the channels in a temporary repository. In some examples, the channel identifier 152 includes functionality for identifying a selected or tuned-to channel after a predetermined amount of time on the channel or after a pause before a next channel selection. According to an aspect, the channel identifier 152 is further operable to receive user profile data including one or more channels pre-selected by the user. For example, if the user usually views channel X, channel Y, and channel Z, the user may select channels X, Y, and Z in the profile settings.

The input receiver 154 is operable to receive an indication of selection of an option to view the last viewed zone from an endpoint device 104, 108, 110, 112, 114. According to an aspect, the input receiver 154 is in communication with the optional UI provisioner 156. The UI provisioner 156 is operable to provide a user interface, as will be illustrated in FIGS. 3A and 3B, to receive a user selection of a predetermined N channels for display in the last viewed zone user interface 400.

According to an aspect, the optional list updater 158 is in communication with the channel identifier 152 and the UI provisioner 156. The list updater 158 receives the channel list from the channel identifier 152 and updates the channel list when there is a channel selection received from the UI provisioner 156.

According to an aspect, the UI provisioner 156 is also in communication with the list updater 158. When an indication of a selection to view the last viewed zone is received, the list updater 158 accesses the channel list from the channel identifier 152, and compares the channels within the channel list to the channels received via the UI provisioner 156. Further, the list updater 158 is operable to update the channels in the channel list with channel selections received via the UI provisioner 156. The list updater 158 further includes functionality to send the updated channel list to the zone generator 160.

According to another aspect, the list updater 158 is also in communication with the input receiver 154. When an indication of a selection to view the last viewed zone is received from the input receiver 154, the list updater 158 accesses the channel list from the channel identifier 152, and sends the channel list to the zone generator 160.

The zone generator 160 is operable to receive the channel list from the list updater 158, to generate the last viewed zone user interface 400, and provide the last viewed zone user interface 400 to the endpoint device. As described earlier, with respect to FIG. 1A, the generation of the last viewed zone user interface 400 via the zone generator 160 may be implemented via the tuners 111, a video composition component 120, or via a network CDN 180.

One skilled in the art will understand that various embodiments of the last viewed zone engine 150 are in communication with various computer-readable storage media, transmission media, endpoint devices 104, 108, 110, 112, 114, computers, servers, etc., and that the precise implementation, arrangement of, and methods of communications with these components relative to the last viewed zone engine 150 will vary accordingly without departing from the spirit and scope of the present disclosure.

Figure 4:
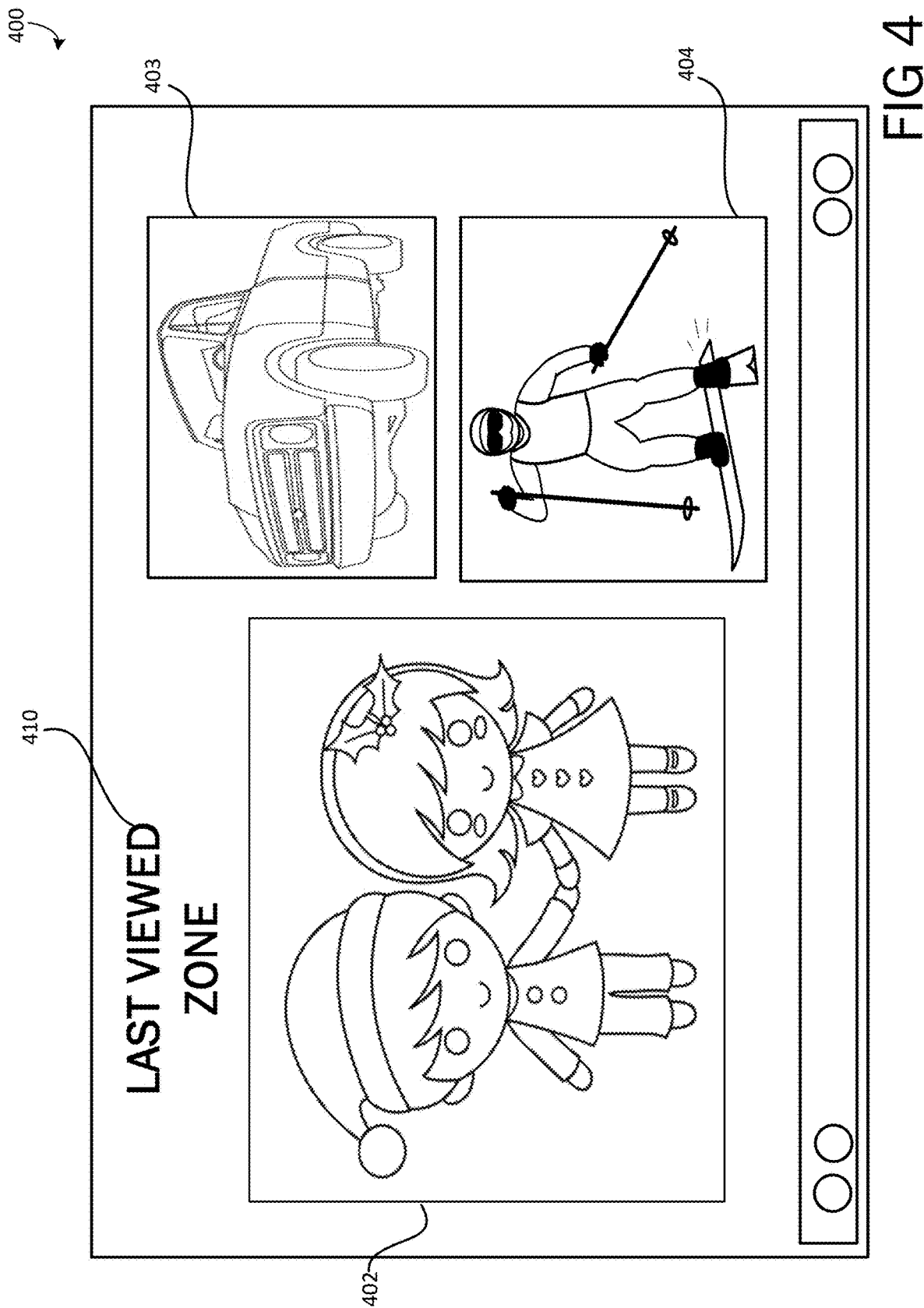
FIG. 4 is an illustration of an example last viewed zone.

Further, a selection to view a last viewed zone may be made via various methods. For example, an indication of a selection to view a last viewed zone may be received from a selection of a guide view menu option, selection of a full screen view menu option, selection of a button 277 on a remote control or other integrated communication device, etc. Consider, for example, that a user is watching a program on a viewing device, and is switching back and forth between two or three channels during commercial breaks. As illustrated in FIG. 2A, the user may select to view a last viewed zone via selection of a last viewed zone option 203 displayed in a guide user interface 200. Accordingly, the user is presented with a last viewed zone user interface 400 as illustrated in FIG. 4.

Figure 2B:
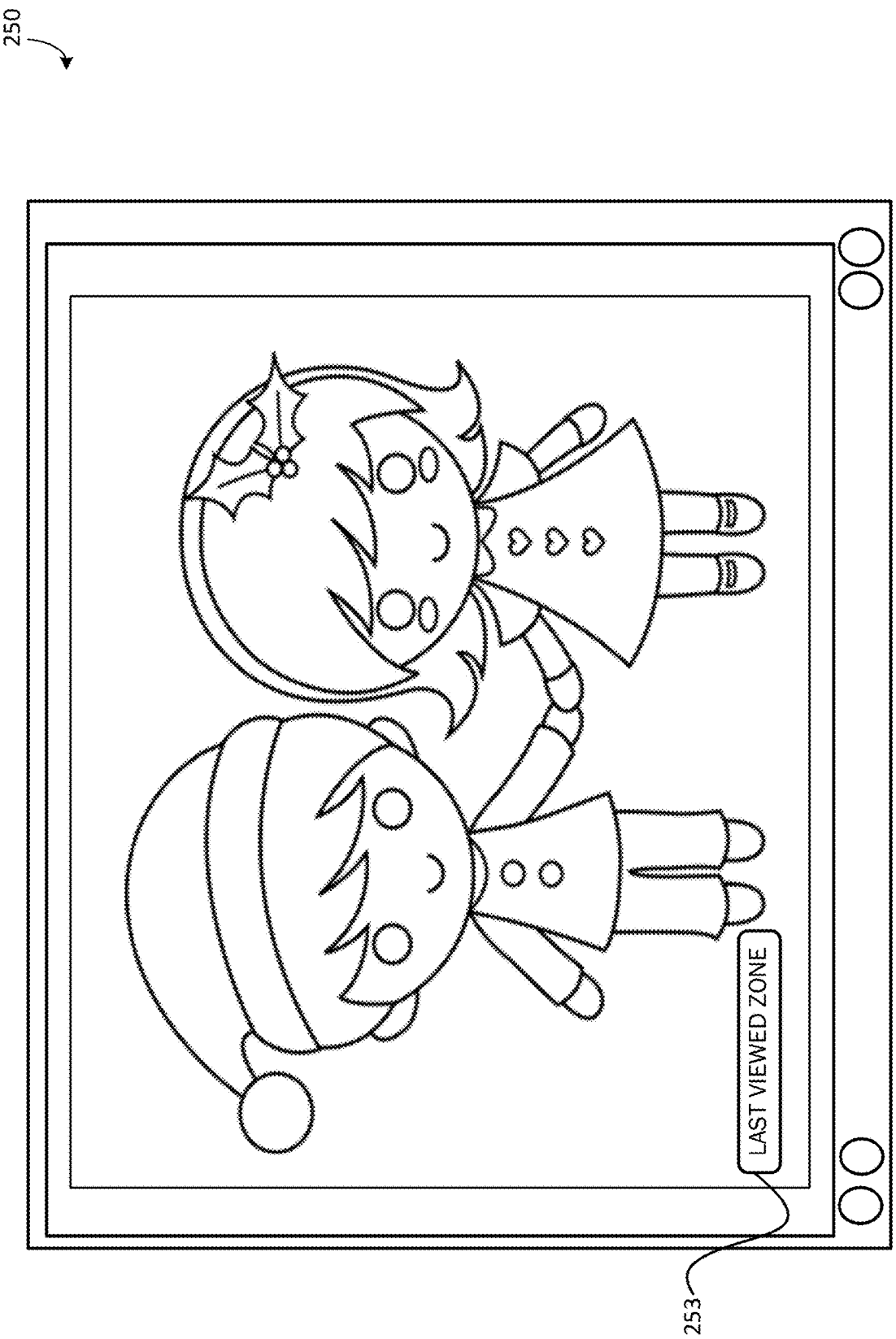
FIG. 2B, is an illustration of an example option for invoking a last viewed zone user interface from a full screen video viewing user interface.

According to another example, the last viewed zone user interface 400 is invoked by a selection of a last viewed zone option 253 displayed in a full screen video viewing user interface 250. With reference now to FIG. 2B, an example of a last viewed zone option 253, provided in a full screen video viewing user interface 250, is illustrated. Upon receiving an indication of a selection of the last viewed zone option 253, the last viewed zone user interface 400 is generated and displayed, wherein the last viewed zone user interface 400 comprises video streams of the channels from the channel list.

Figure 2C:
FIG. 2C, is an illustration of an example option for invoking a last viewed zone user interface from a remote control or other integrated communication device.

According to yet another example, the last viewed zone user interface 400 is invoked by a selection of a last viewed zone option 277 on a remote control 280 as illustrated in FIG. 2C. For example, as a user is viewing a content item, the user may select the last viewed zone option 277 on a remote control 280, and a last viewed zone user interface 400 comprising video streams of the channels from the channel list is generated and displayed.

Figure 3A:
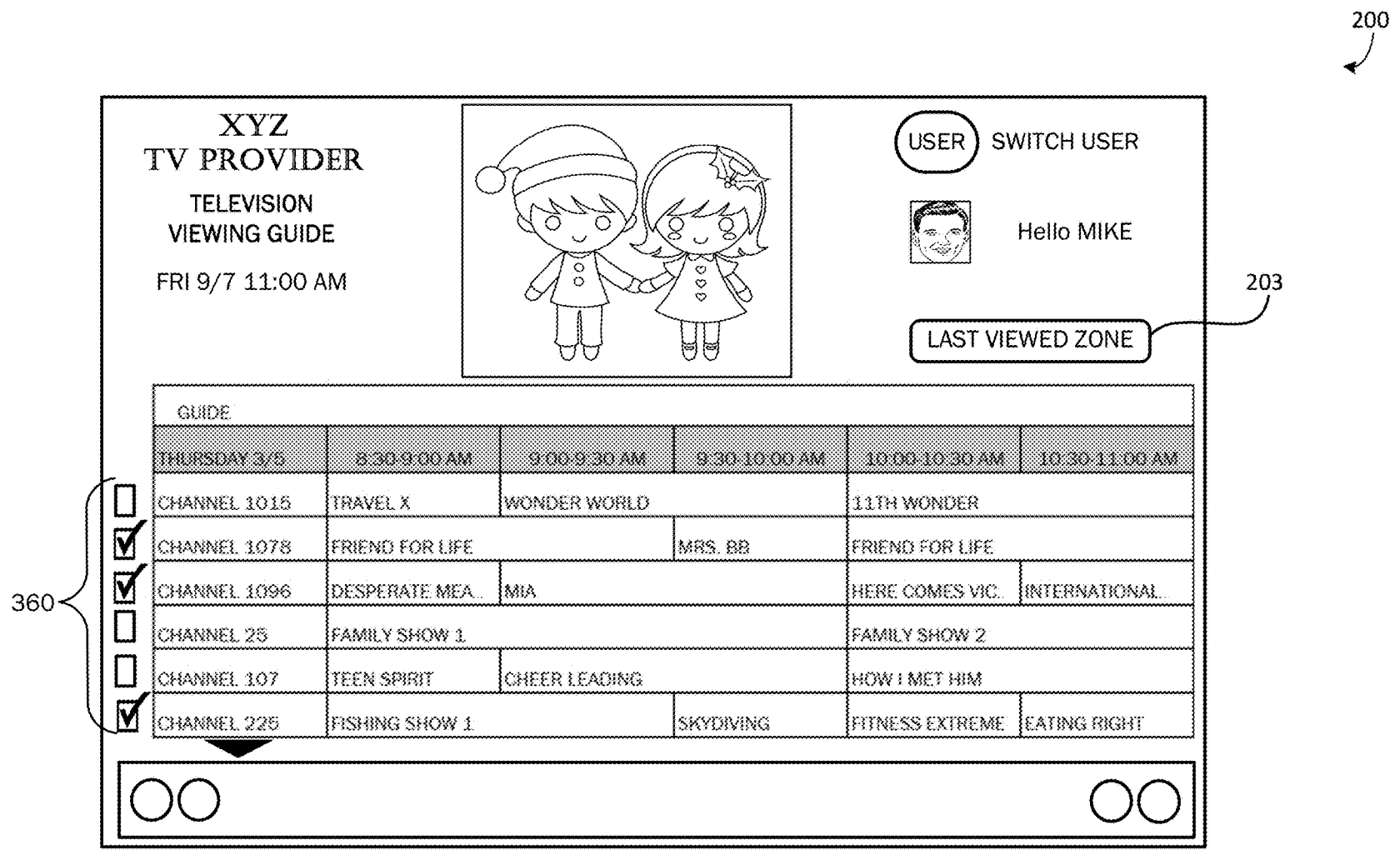

As described above, the video streams of channels displayed in the last viewed zone user interface 400 may be user-selected. According to an example, a user interface comprising a selectable option 360 to select the channels is provided in a programming guide interface. For example and as illustrated in FIG. 3A, when a last viewed zone option 203 is selected, a selectable option 360 is provided for enabling the user to selectively indicate which channels he/she would like to include in the last viewed zone user interface 400.

Figure 3B:
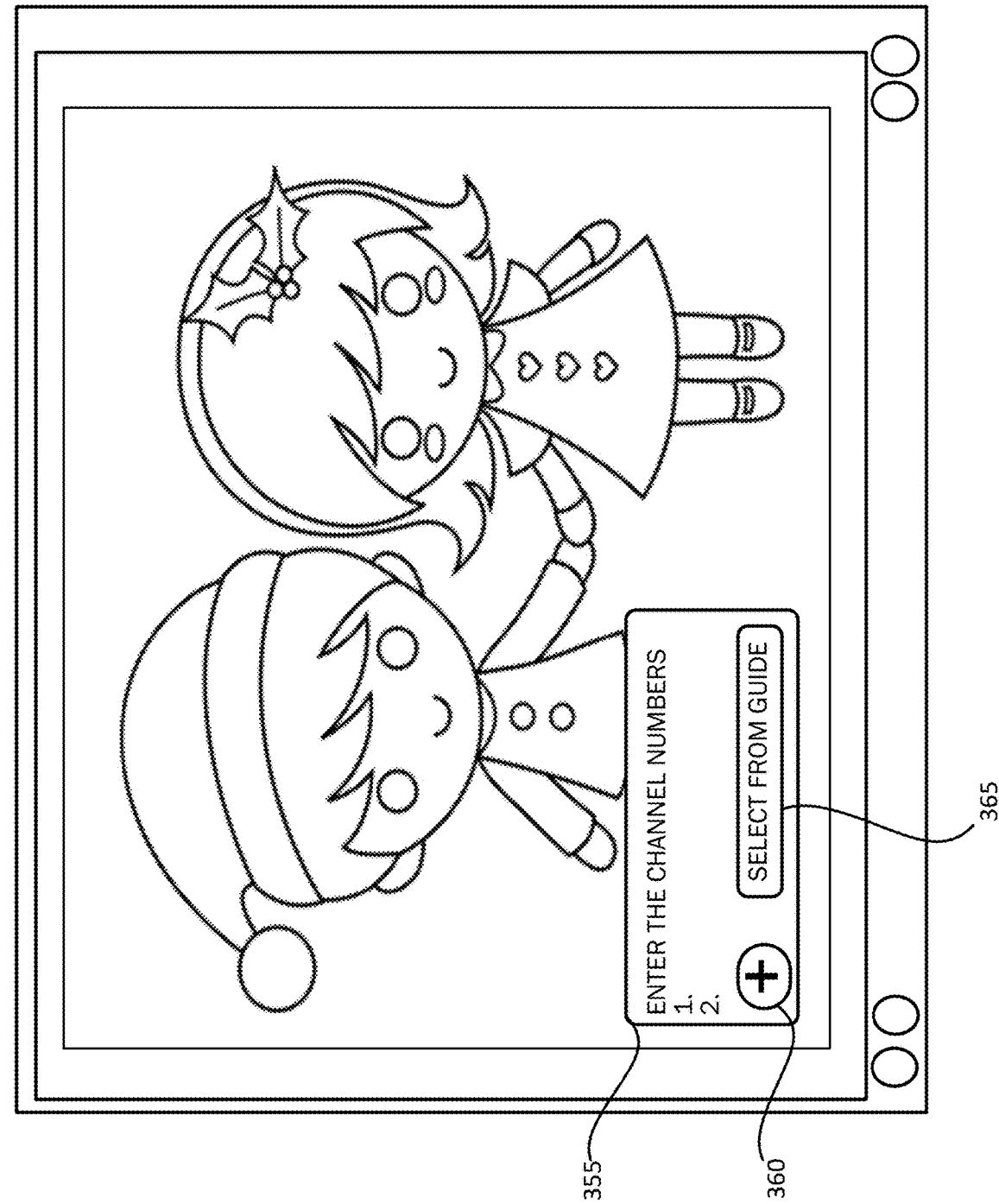
FIG. 3B is an illustration of an example user interface for receiving a user selection of channels, from a full screen video viewing user interface, to be displayed in a last viewed zone user interface.

According to another example, a user interface is provided in a full screen video viewing user interface 250, which may be utilized to accept input from the user as to which channels to include in the last viewed zone. For example, a selection of a last viewed zone option, such as the example last viewed zone option 203 illustrated in FIG. 2B, triggers a display of a channel selection user interface 355, an example of which is illustrated in FIG. 3B. The channel selection user interface 355 may be displayed in the full screen video viewing user interface 250, and is utilized to input or select one or more channel numbers or an option 365 to switch to the guide user interface 200 illustrated in FIG. 3A. According to an example, a selectable option 360 is provided to add another channel up to a predetermined N channels that are available for simultaneous viewing in the last viewed zone.

FIG. 4 is an illustration of an example last viewed zone user interface 400. The last viewed zone user interface 400 comprises a simultaneous display of a plurality of video streams 402, 403, 404 of programming airing on a predetermined number of channels. In the example illustrated in FIG. 4, the last viewed zone user interface 400 includes simultaneous video streams of three channels. According to an aspect, audio is provided for the video stream of the user's choice and may be switched between video streams 402, 403, 404 by user selection. For example, in FIG. 4, video streams 402, 403, 404 of the last three channels tuned-to or selected by the user are displayed in the last viewed zone user interface 400, and audio is provided for a particular video stream 402.

According to an example, audio is provided for a selected video stream 402, 403, 404 in the last viewed zone user interface 400. For example, when focus is put on a particular video stream 403 in the last viewed zone user interface 400 (e.g., when a cursor or frame is moved to a particular video stream), the audio for the selected video stream 403 is provided. If the user subsequently selects another video stream 404, the audio for the subsequently selected video stream 404 is provided. According to another example, audio is automatically provided for the last channel tuned-to by the user. For example, consider that the user tunes to a channel with video stream 403, then switches to another channel with video stream 404, and then to another channel with video stream 402. When the user invokes the last viewed zone user interface 400, the audio is automatically provided for the channel with video stream 402, since video stream 402 is associated with the channel lasted tuned to by the user.

Further, according to another example, an option to tune to a specific video stream 402, 403, or 404, in a full screen video viewing user interface 250 is provided in the last viewed zone user interface 400. For example, the video streams 402, 403, and 404 are selectable video streams, such that when the user selects one, the selected video stream is displayed in full screen.

Figure 5A:
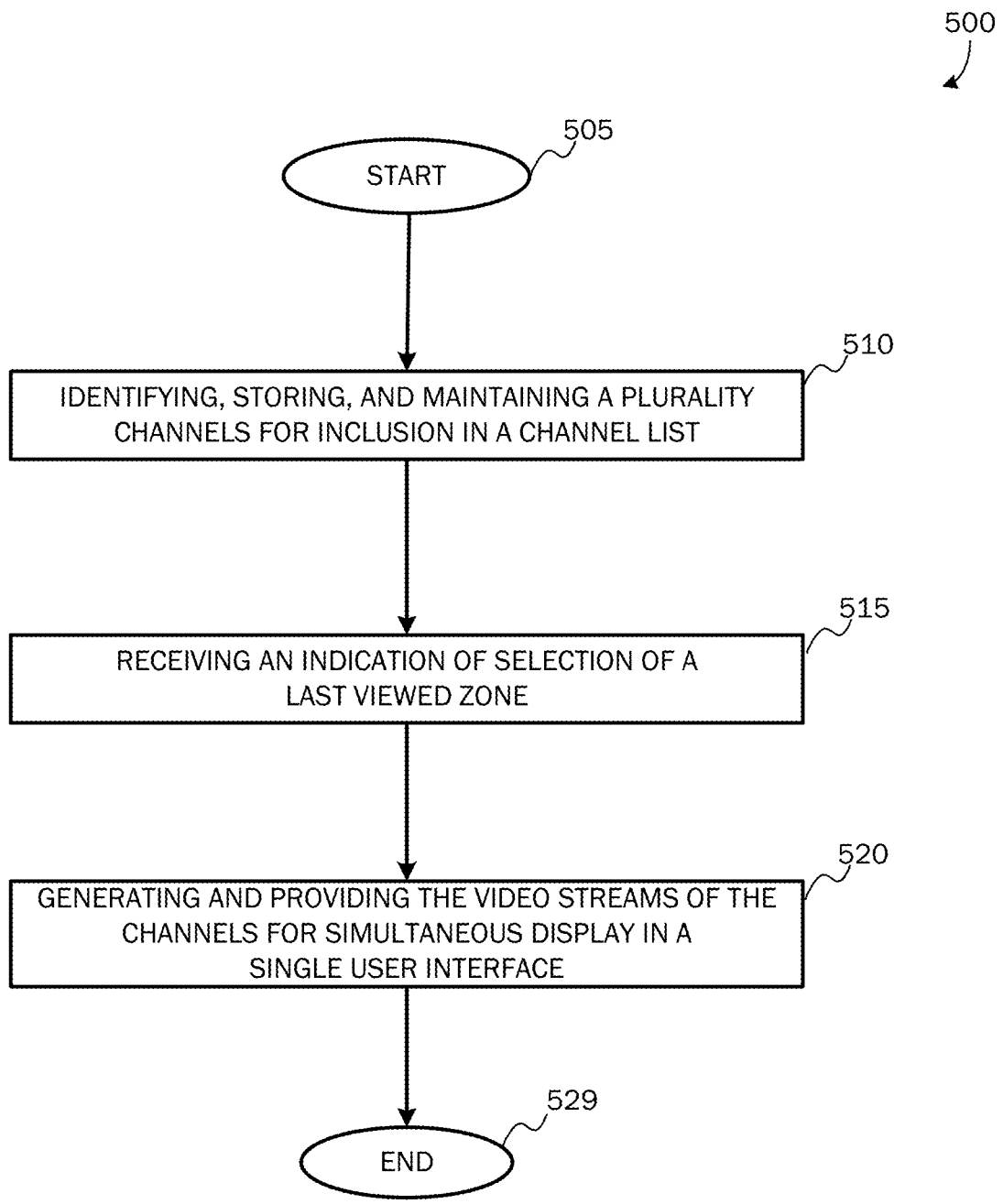
FIG. 5A is a flowchart illustrating an example method for providing a last viewed zone.

FIG. 5A is a flowchart illustrating an example method 500 for providing a last viewed zone. According to an example, the method 500 starts at OPERATION 505, and proceeds to OPERATION 510, where one or more channels viewed by a user are identified and added to a channel list. For example, as the user switches from one channel to another, the channels are identified and added to the channel list, which maintains a plurality of channels. According to an example, a channel is identified after a predetermined amount of time on the channel. The channel list is stored in a temporary repository.

The method 500 proceeds to OPERATION 515, where an indication of a selection to view a last viewed zone is received. As described above, a selection to view a last viewed zone user interface 400 may be made via a selection of a last viewed zone option 203 in a guide user interface 200 as illustrated in FIG. 2A, an option 253 provided on a full screen viewing interface 250 as illustrated in FIG. 2B, selection of a button 277 on a remote control 280 as illustrated in FIG. 2C or other integrated communication device, or via another selection means.

The method 500 then proceeds to OPERATION 520 where the last viewed zone user interface 400 comprising the video streams of the last N tuned-to channels is generated for display on the user's display device, for example, as illustrated in FIG. 4. As described earlier, with respect to FIG. 1A, the generation of the last viewed zone user interface 400 may be implemented via the tuners 111, a video composition component 120, or via a network CDN 180. The method 500 ends at OPERATION 529.

Figure 5B:
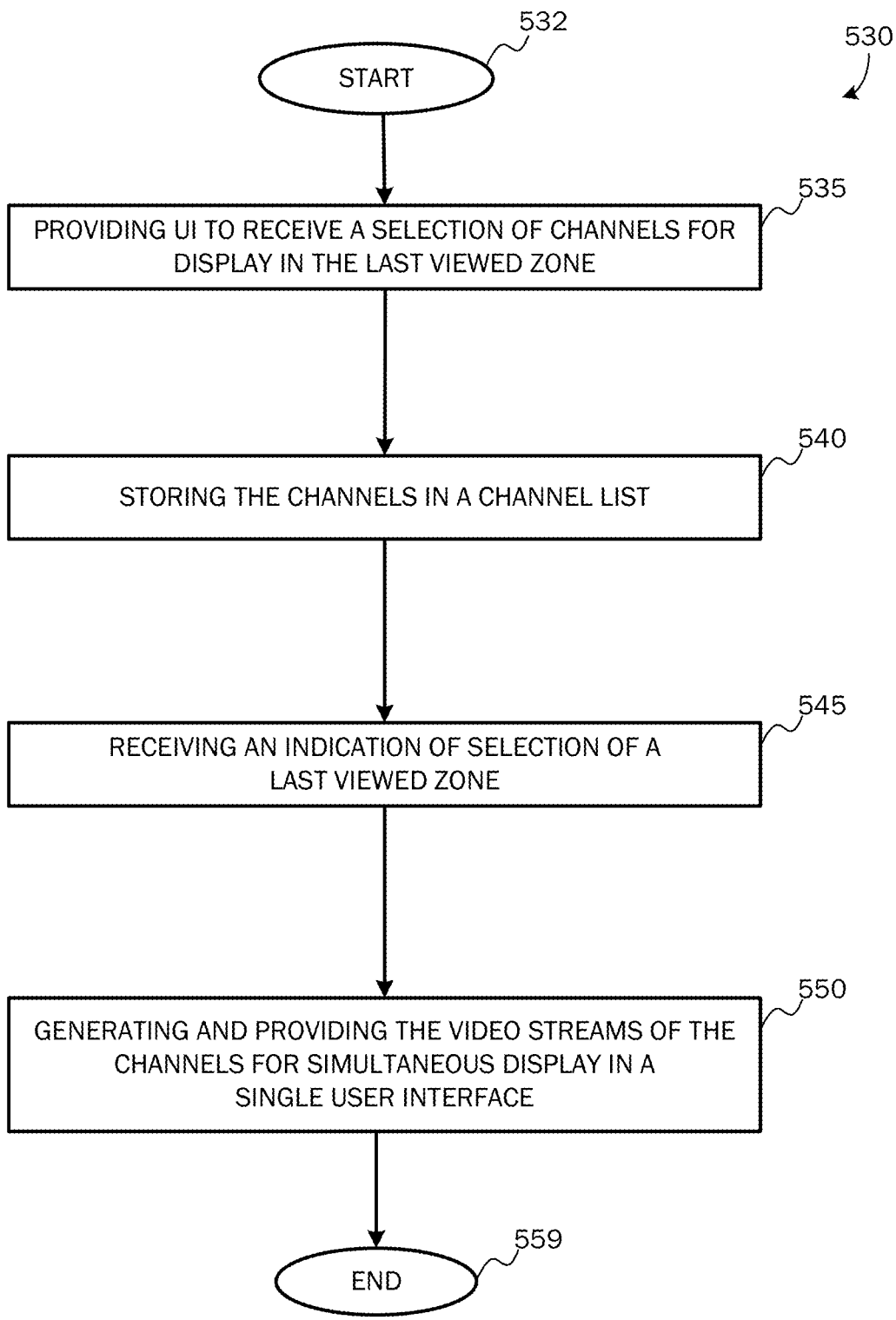
FIG. 5B is a flowchart illustrating another example method for providing a last viewed zone.

FIG. 5B is a flowchart illustrating another example method 530 for providing a last viewed zone. The method 530 starts at OPERATION 532, and proceeds to OPERATION 535, where a user interface is provided to receive an input or selection of channels from a user. For example, the user interface may be part of a user settings menu provided when the user is setting up an associated user profile. As another example, the user interface is provided in response to a selection made by the user. For example, if the user typically views channel X, channel Y, and channel Z, the user may input or select channels X, Y, and Z in the user interface for inclusion in the last viewed zone user interface.

The method 530 proceeds to OPERATION 540, where the user-selected channels that are received in OPERATION 535 are added to the channel list, which is stored in a temporary repository.

The method 530 proceeds to OPERATION 545, where an indication of a selection to view a last viewed zone is received. According to an example, OPERATION 545 occurs prior to OPERATIONS 535 and 540. For example, when a selection to view a last viewed zone is received, a user interface is provided to the user to select the channels for inclusion in the last viewed zone user interface.

The method 530 proceeds to OPERATION 550, where the last viewed zone user interface 400 comprising the video streams of the channels selected by the user is generated for display on the user's display device. The method 530 ends at OPERATION 559.

FIG. 5C is a flowchart illustrating another example method 570 for providing a last viewed zone. According to an example, the method 570 starts at OPERATION 572, and proceeds to OPERATION 575, where a user interface is provided to receive a user selection of channels for inclusion in a last viewed zone user interface 400, for example, like the example user interfaces illustrated in FIGS. 3A and 3B. During OPERATION 575, the user-selected channels that are received are added to the channel list, which is stored in a temporary repository.

The method 570 proceeds to OPERATION 580, where one or more channels are viewed by the user, and are included in a channel list. For example, when the user switches from one channel to another, the channels are identified and added to the channel list, which maintains a plurality of channels. According to an example, a channel is identified after a predetermined amount of time on the channel. The channel list is stored in a temporary repository.

The method 570 proceeds to OPERATION 585, where an indication of a selection to view a last viewed zone is received. When the indication of a selection to view a last viewed zone is received at OPERATION 585, the method 570 proceeds to OPERATION 590, where a last viewed zone user interface 400 is generated. During OPERATION 590, the last viewed zone engine 150 determines which channels to include for display in the last viewed zone user interface 400. In some examples, the last viewed zone user interface 400 includes a combination of user-selected channels and the last N channels that were previously viewed by the user. The composition of the combination (e.g., the number of user-selected channels versus the number of previously viewed channels) may be predetermined by the service provider, or may be selected by the user. For example, if the user's device and system allow for a display of four video streams in the last viewed zone user interface 400, the composition of the video streams may include two channels that were selected by the user and two channels that were previously tuned to by the user.

In some examples, the user is enabled to select a number of video streams to include in the next viewed zone display up to the maximum number of video streams that can be displayed based on the user's device and the system's limitations. During OPERATION 590, the last viewed zone engine 150 identifies any duplications between the channels in the channel list, for example, duplications in channels tuned to by the user or duplications in channels that are preselected by the user and the channels that are identified by the system as the last N channels previously tuned to by the user. For example, consider that the user's device and system allow for a display of four video streams in the last viewed zone user interface 400. Also consider that the user selects channels X and Y for inclusion in the last viewed zone and that the last two channels previously tuned to by the user include channels A and X. Accordingly, the last viewed zone engine 150 is operable to identify a duplication in channel X.

When there is a duplication, the last viewed zone engine 150 includes functionality to identify a next previously viewed channel from the channel list to include in the last viewed zone, such that the maximum number of video streams that can be accommodated per the system and device capabilities can be presented. Continuing with the example from above, consider that the next previously viewed channel in the channel list is channel B. Accordingly, the last viewed zone engine 150 is operable to include the video streams of channels A, B, X, and Y in the last viewed zone user interface 400. The last viewed zone engine 150 generates the last viewed zone user interface 400 including the video streams of the channels determined by the engine for inclusion in the last viewed zone.

The method 570 proceeds to OPERATION 595, where the last viewed zone user interface 400 is displayed on the user's display device. The method 570 ends at OPERATION 599.

FIG. 6 is a block diagram illustrating a cable television services system 600 (hereafter referred to as "CATV") architecture providing an operating environment according to an aspect. As should be appreciated, a CATV system 600 is but one of various types of systems that may be utilized for providing an operating environment for providing editing and changing of links of programs in real time. Referring now to FIG. 6, digital and analog video programming, information content and interactive television services are provided via a hybrid fiber coax (HFC) network 615 to a television set 104 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side STB 606 and the server-side application server 640 of the example.

The CATV system 600 is in the form of a distributed client-server computing system for providing video and data flow across the HFC network 615 between server-side services providers (e.g., cable television/services providers) via a server-side head end 610 and a client-side customer via a client-side STB 606 functionally connected to a customer receiving device, such as the television set 104. As is understood by those skilled in the art, modern CATV systems 600 provides a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 104 via the STB 606. Interactive television services that allow a customer to input data to the CATV system 600 likewise are provided by the STB 606. As illustrated in FIG. 6, the STB 606 is a multipurpose computing device having a computer processor, memory, and an input/output mechanism. The input/output mechanism receives input from server-side processes via the HFC network 615 and from customers via input devices such as the remote control device 628, keyboard 630, or other computing device, such as a tablet/slate computer 108, smart phone 110, etc. The remote control device 628 and the keyboard 630 communicates with the STB 606 via a suitable communication transport such as the infrared connection 632. The remote control device 628 may include a biometric input panel 629. The STB 606 also includes a video processor for processing and providing digital and analog video signaling to the television set 104 via a cable communication transport 634. A multi-channel tuner is provided for processing video and data to and from the STB 606 and the server-side head end 610, described below.

The STB 606 also includes an operating system 622 for directing the functions of the STB 606 in conjunction with a variety of client applications 625. For example, if a client application 625 requires a news flash from a third-party news source to be displayed on the television set 104, the operating system 622 causes the graphics functionality and video processor of the STB 606, for example, to output the news flash to the television set 104 at the direction of the client application 625 responsible for displaying news items.

Because a variety of different operating systems 622 are utilized by a variety of different brands and types of set-top boxes, a middleware layer 624 may be provided to allow a given software application to be executed by a variety of different operating systems. According to an aspect, the middleware layer 624 includes a set of application programming interfaces (APIs) that are exposed to client applications 625 and operating systems 622 that allow the client applications to communicate with the operating systems through common data calls understood via the API set. As described below, a corresponding middleware layer 642 is included on the server side of the CATV system 600 for facilitating communication between the server-side application server and the client-side STB 606. The middleware layer 642 of the server-side application server and the middleware layer 624 of the client-side STB 606 formats data passed between the client side and server side according to the Extensible Markup Language (XML).

According to one example, the STB 606 passes digital and analog video and data signaling to the television set 104 via a one-way communication transport 634. According to other aspects, two-way communication transports are utilized, for example, via high definition multimedia (HDMI) ports. The STB 606 receives video and data from the server side of the CATV system 600 via the HFC network 615 through a video/data downlink and data via a data downlink. The STB 606 transmits data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the STB 606 for use by the STB 606 and for distribution to the television set 104. As is understood by those skilled in the art, the "in band" signaling space operates at a relative high frequency, e.g., between 54 and 1000 megahertz. The signaling space is generally divided into 6 megahertz channels in which is transmitted as a single analog signal or a greater number (e.g., ten) of digital signals.

The data downlink and the data uplink, illustrated in FIG. 6, between the HFC network 615 and the STB 606 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side STB 606 and the server-side application server 640 is typically passed through the "out of band" data links. Alternatively, according to an aspect, an "in band" data carousel is positioned in an "in band" channel into which a data feed is processed from the server-side application server 640 through the HFC network 615 to the client-side STB 606. Operation of data transport between components of the CATV system 600, described with reference to FIG. 6, is well known to those skilled in the art.

Referring still to FIG. 6, the head end 610 of the CATV system 600 is positioned on the server side of the CATV system 600 and includes hardware and software systems responsible for originating and managing content for distributing through the HFC network 615 to client-side STBs 606 for presentation to customers via television sets 104. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side STB 606 via the HFC network 615. As described above with reference to the STB 606, the application server 640 includes a middleware layer 642 for processing and preparing data from the head end of the CATV system 600 for receipt and use by the client-side STB 606. For example, the application server 640 via the middleware layer 642 obtains data from third-party services 646 via the Internet 644 for transmitting to a customer through the HFC network 615 and the STB 606. For example, content metadata a third-party content provider service is downloaded by the application server via the Internet 644. When the application server 640 receives the downloaded content metadata, the middleware layer 642 is utilized to format the content metadata for receipt and use by the STB 606. Therefore, content metadata are sent and categorized based on the availability to the customer's program guide data.

According to an aspect, data obtained and managed by the middleware layer 642 of the application server 640 is formatted according to the Extensible Markup Language and is passed to the STB 606 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the STB 606. According to an aspect, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600, which includes data on a given customer.

According to an aspect, a billing system 662 includes information such as a customer's name, street address, business identification number, Social Security number, credit history, and information regarding services and products subscribed to by the customer. According to an aspect, the billing system 662 also includes billing data for services and products subscribed to by the customer for bill processing, billing presentment and payment receipt.

According to an aspect, a customer information database 668 includes general information about customers such as place of employment, business address, business telephone number, and demographic information such as age, gender, educational level, and the like. The customer information database 668 also includes information on pending work orders for services or products ordered by the customer. The customer information database 668 also includes general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to aspects, web services system 650 serves as a collection point for data requested from each of the disparate data services systems comprising the data services 626. According to aspects, when the application server 640 requires customer services data from one or more of the data services 626, the application server 640 passes a data query to the web services system 650. The web services system formulates a data query to each of the available data services systems for obtaining any required data for a requesting customer as identified by a STB identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

According to an aspect, an authentication system 666 includes information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
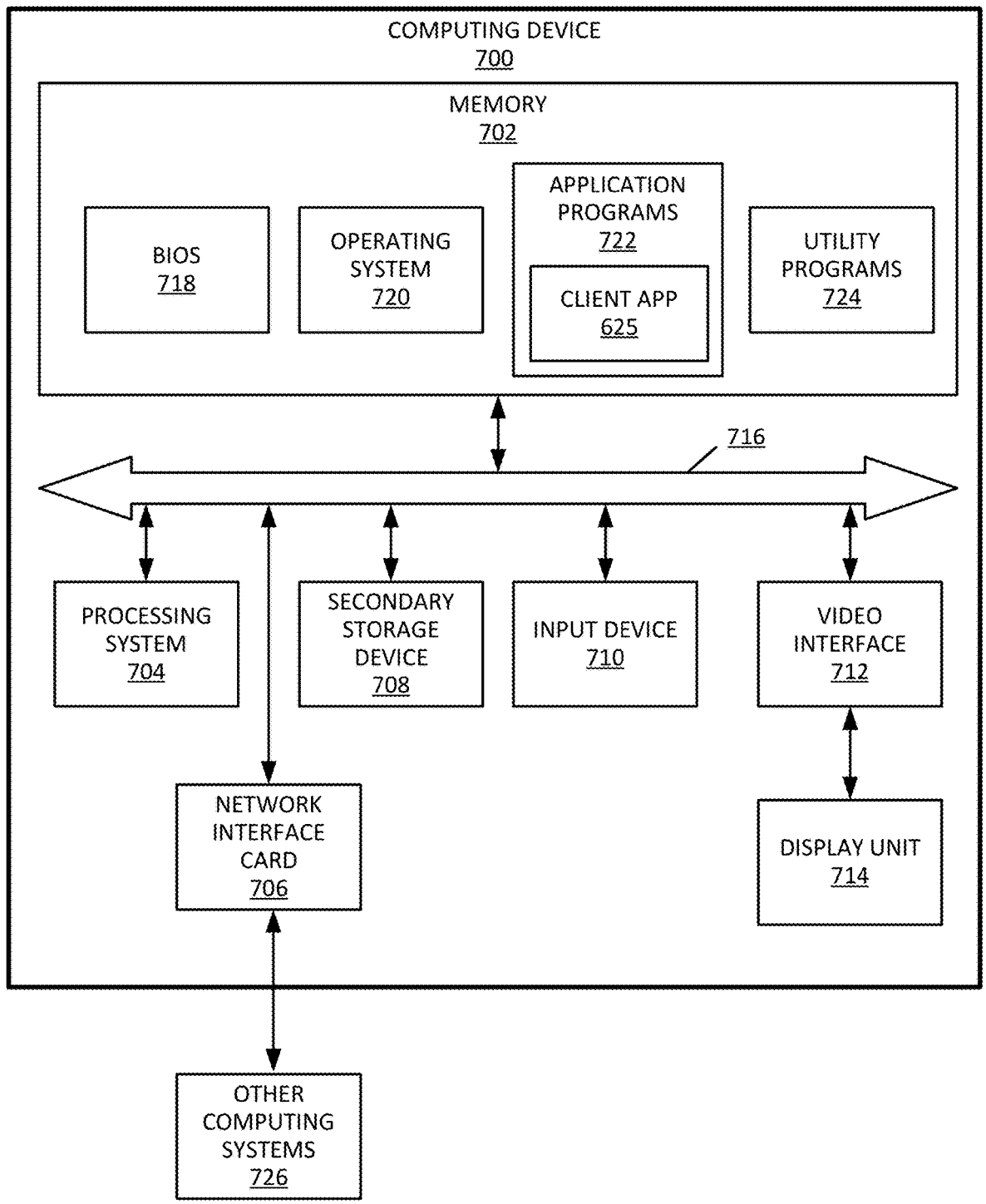
FIG. 7 is a block diagram illustrating example physical components of a computing device with which aspects are practiced.

FIG. 7 is a block diagram illustrating example physical components of a computing device 700 with which various aspects of the disclosure are practiced. In some examples, one or a combination of the components 104, 606, 108, 110, 112, 114, 116, 118, 120, 124 of system 100 may be implemented using one or more computing devices like the computing device 700. It should be appreciated that in other examples, components 104, 606, 108, 110, 112, 114, 120, 122, 124, 126, 128 of system 100 may be implemented using computing devices having hardware components other than those illustrated in the example of FIG. 7.

Computing devices may be implemented in different ways in different examples. For instance, in the example of FIG. 7, the computing device 700 includes a processing system 704, memory 702, a network interface 706, a secondary storage device 708, an input device 710, a video interface 712, a display unit 714, and a communication medium 716. In other examples, the computing device 700 is implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. In various examples, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to an aspect, the term computer-readable storage medium refers to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

According to an aspect, the processing system 704 includes one or more processing units, which includes tangible integrated circuits that selectively execute computer-executable instructions. In various examples, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example, the processing system 704 can comprise Application-Specific Integrated Circuits (ASICs) that provide specific functionality. In yet another example, the processing system 704 provides specific functionality by using an ASIC and by executing computer-executable instructions.

According to aspects, the computing device 700 is enabled to send data to and receive data from a communication network via a network interface 706. In different examples, the network interface 706 is implemented in different ways, such as an Ethernet interface, a token-ring network interface, a fiber optic network interface, a wireless network interface (e.g., Wi-Fi, Wi-Max, etc.), or another type of network interface. The network interface 706 allows the device to communicate with other devices, such as over a wireless network in a distributed computing environment, a satellite link, a cellular link, and comparable mechanisms. Other devices may include computer device(s) that execute communication applications, storage servers, and comparable devices.

According to an aspect, the secondary storage device 708 includes one or more computer-readable storage media, and stores data and computer-executable instructions not directly accessible by the processing system 704. That is, the processing system 704 performs an I/O operation to retrieve data and/or computer-executable instructions from the secondary storage device 708. In various examples, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different examples, the video interface 712 is implemented in different ways. For example, the video interface 712 is a video expansion card. In another example, the video interface 712 is integrated into a motherboard of the computing device 700. In various examples, the display unit 714 can be a an LCD display panel, a touch-sensitive display panel, an LED screen, a projector, a cathode-ray tube display, or another type of display unit. In various examples, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different examples, the communications medium 716 facilitates communication among different components of the computing device 700. For instance, in the example of FIG. 7, the communications medium 716 facilitates communication among the memory 702, the processing system 704, the network interface 706, the secondary storage device 708, the input device 710, and the video interface 712. In different examples, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users. The memory 702 also stores one or more utility programs 724 that, when executed by the processing system 704, cause the computing device 700 to provide utilities to other software programs.

Aspects of the present disclosure may be utilized in various distributed computing environments where tasks are performed by remote processing devices that are linked through a communications network in a distributed computing environment.

FIGS. 8A-B illustrate a suitable mobile computing environment, for example, a mobile computing device 110, a smart phone, a tablet personal computer 108, a laptop computer, and the like, with which aspects of the present disclosure are practiced. The mobile computing device 800 is illustrative of any suitable device operative to send, receive and process wireless communications according to aspects of the present disclosure. A display screen 805 is operative for displaying a variety of information such as information about incoming and outgoing communications, as well as, a variety of data and displayable objects, for example, text, alphanumeric data, photographs, and the like.

Data input to the mobile computing device 800 may be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device, or any other suitable input means. Data may be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. According to an aspect, memory 845 is utilized for storing a device operating system, device programming, one or more stored applications, for example, mobile telephone applications, data processing applications, calculators, games, Internet browsing applications, navigation applications, acceleration applications, camera and/or video applications, etc.

According to an aspect, mobile computing device 800 contains an accelerometer 855 for detecting acceleration, and can be used to sense orientation, vibration, and/or shock. According to another aspect, mobile computing device 800 contains a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the mobile computing device 800 to communicate with other communication devices and systems via a wireless network. According to an aspect, radio functions 850 are utilized to communicate with a wireless or WIFI-based positioning system to determine a location of mobile computing device 800.

Although described herein in combination with mobile computing device 800, in alternative examples the disclosure may be used in combination with any number of computer systems, such as in desktop environments, laptop or notebook computer systems, multiprocessor systems, micro-processor based or programmable consumer electronics, networked PCs, mini computers, main frame computers and the like. Aspects of the present disclosure may be utilized in various distributed computing environments where tasks are performed by remote processing devices that are linked through a communications network in a distributed computing environment, and where programs may be located in both local and remote memory storage.

Examples are described above with reference to block diagrams and/or operational illustrations of methods, systems, and computer program products according to various aspects. The functions/acts noted in the blocks may occur out of the order as shown in any flowchart or described herein with reference to FIGS. 1A-8B. For example, two processes shown or described in succession may in fact be executed substantially concurrently or the blocks may sometimes be executed in the reverse order, depending upon the functionality/acts involved.

While certain examples have been described, other examples may exist. Furthermore, although examples have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the aspects of the present disclosure.

The foregoing description of aspects of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A method for providing a last viewed zone, the method comprising:
   tuning to a selected channel in response to receiving an indication of a channel selection by a user;
   in response to tuning to the selected channel, storing the selected channel in a channel list, the channel list including a plurality of channels previously tuned to and viewed by the user as a result of corresponding channel changes;
   displaying a programming guide interface comprising the channel list;
   receiving a selection from the user adding a channel from the channel list to a last viewed zone user interface;
   upon receiving a request from the user to view the last viewed zone user interface, generating the last viewed zone user interface by determining channels up to a maximum number of channels for display in the last viewed zone user interface, the determination comprising:
      identifying, from the channel list, a set of channels most recently tuned to and viewed by the user;
      determining the channels for display include the channel added by the user and the identified set of channels up to the maximum number of channels;
      determining whether the channel added by the user duplicates a channel within the identified set of channels; and
      responsive to determining a duplication, replacing one of the duplicates with the next most recently tuned to and viewed channel to maintain the maximum number of channels for display; and
   for each of the determined channels for display in the last viewed zone user interface, providing a video stream of content airing on the respective channel for simultaneous display in the last viewed zone user interface.

2. The method of claim 1, wherein generating the last viewed zone user interface comprises leveraging a plurality of available tuners in association with the display device to provide the simultaneous display of the video stream of content for each of the determined channels up to the maximum number of channels.

3. The method of claim 1, wherein generating the last viewed zone user interface comprises leveraging a plurality of available tuners in association with a gateway device to provide the simultaneous display of the video stream of content for each of the determined channels up to the maximum number of channels.

4. The method of claim 1, wherein generating the last viewed zone user interface comprises leveraging a video composition component in association with a client application and a back end server to provide the simultaneous display of the video stream of content for each of the determined channels up to the maximum number of channels.

5. The method of claim 1, wherein selecting the maximum number of channels to include in the last viewed zone user interface comprises identifying a number of tuners available to the user, and selecting the maximum number of channels based on the number of available tuners.

6. The method of claim 5, wherein identifying the number of tuners available to the user comprises identifying the number of tuners available to the user via one of:
   a set top box;
   a full service gateway device; or
   an endpoint device.

7. The method of claim 1, wherein generating the last viewed zone user interface comprises generating a mosaic style display of the video stream of content for each of the determined channels.

8. The method of claim 1, wherein receiving the indication of the channel selection by the user comprises receiving an indication of a selection of the channel and an indication of the user viewing content on the channel.

9. The method of claim 8, wherein receiving the indication of the user viewing content on the channel comprises receiving an indication of a predetermined interval between the selection of the channel and a selection of a next channel.

10. The method of claim 1, further comprising providing audio for a video stream of a most recently selected channel in the channel list.

11. The method of claim 1, further comprising:
   receiving an indication of a focus on a video stream in the last viewed zone user interface; and
   providing audio for the video stream.

12. The method of claim 1, further comprising:
   receiving an indication of a selection of a video stream in the last viewed zone user interface; and
   tuning to the channel associated with the selected video stream.

13. A system for providing a last viewed zone, the system comprising:
   a memory storage; and
   one or more processing unit(s) coupled to the memory storage, wherein the one or more processing units:
      receive an indication of a channel selection by a user and, in response, tune to a selected channel;
      in response to tuning to the selected channel, store the selected channel in a channel list, the channel list including a plurality of channels previously tuned to and viewed by the user as a result of corresponding channel changes;
      display a programming guide interface comprising the channel list;
      receive a selection from the user adding a channel from the channel list to a last viewed zone user interface;

upon receipt of a request from the user to view the last viewed zone user interface, generate the last viewed zone user interface by determining channels up to a maximum number of channels for display in the last viewed zone user interface, the determination comprising:

identifying, from the channel list, a set of channels most recently tuned to and viewed by the user;

determining channels for display include the channel added by the user and the identified set of channels up to the maximum number of channels;

determining whether the channel added by the user duplicates a channel within the identified set of channels; and responsive to determining a duplication, replacing one of the duplicates with the next most recently tuned to and viewed channel to maintain the maximum number of channels for display; and for each of the determined channels for display in the last viewed zone user interface, providing a video stream of content airing on the respective channel for simultaneous display in the last viewed zone user interface.

14. The system of claim 13, wherein in generating the last viewed zone user interface, the one or more processing units:

leverage a plurality of available tuners in association with the display device to provide the simultaneous display of the video stream of content for each of the determined channels up to the maximum number of channels;

leverage a plurality of available tuners in association with a gateway device to provide the simultaneous display of the video stream of content for each of the determined channels up to the maximum number of channels; or leverage a video composition component in association with a client application and a back end server to provide the simultaneous display of the video stream of content for each of the determined channels up to the maximum number of channels.

15. The system of claim 13, wherein in selecting the maximum number of channels to include in the last viewed zone user interface, the one or more processing units:

identify a number of tuners available to the user, the number of tuners available to the user via one of:
a set top box;
a full service gateway device; or
an endpoint device; and select the maximum number of channels based on the number of available tuners.

16. The system of claim 13, wherein in receiving the indication of the channel selection by the user, the one or more processing units receive an indication of a selection of the channel and an indication of the user viewing content on the channel, wherein the indication of the user viewing content on the channel comprises receiving an indication of a predetermined interval between the selection of the channel and a selection of a next channel.

17. The system of claim 13, wherein the one or more processing units:

receive an indication of a selection of a video stream in the last viewed zone user interface; and tune to the channel associated with the selected video stream.

18. A non-transitory computer readable medium having stored thereon computer-executable instructions which, when executed by a computer, perform a method for providing a last viewed zone, comprising:

tuning to a selected channel in response to receiving an indication of a channel selection by a user, the channel selection including a selection of the channel and an indication of the user viewing content on the channel, wherein the indication of the user viewing content on the channel comprises receiving an indication of a predetermined interval between selection of the channel and a selection of a next channel;

in response to tuning to the selected channel, storing the selected channel in a channel list, the channel list including a plurality of channels previously tuned to and viewed by the user as a result of corresponding channel changes;

receiving a selection from the user adding a channel from the channel list to a last viewed zone user interface;

displaying a programming guide interface comprising the channel list;

upon user request to view the last viewed zone user interface, generating the last viewed zone user interface by determining channels up to a maximum number of channels for display in the last viewed zone user interface, the determination comprising:

identifying, from the channel list, a set of channels most recently tuned to and viewed by the user;

determining the channels for display include the channel added by the user and the identified set of channels up to the maximum number of channels;

determining whether the channel added by the user duplicates a channel within the identified set of channels; and responsive to determining a duplication, replacing one of the duplicates with the next most recently tuned to and viewed channel to maintain the maximum number of channels for display; and for each of the determined channels for display in the last viewed zone user interface, providing a video stream of content airing on the respective channel for simultaneous display in the last viewed zone user interface.

* * * * *